Aug. 8, 1967   B. S. ZELLER   3,334,703
PUSH-START CIRCUIT

Filed June 7, 1965   6 Sheets-Sheet 1

INVENTOR
BURTON S. ZELLER
BY Robert H Johnson
ATTORNEY

INVENTOR
BURTON S. ZELLER
BY *Robert H. Johnson*
ATTORNEY

INVENTOR
BURTON S. ZELLER
BY *Robert H Johnson*
ATTORNEY

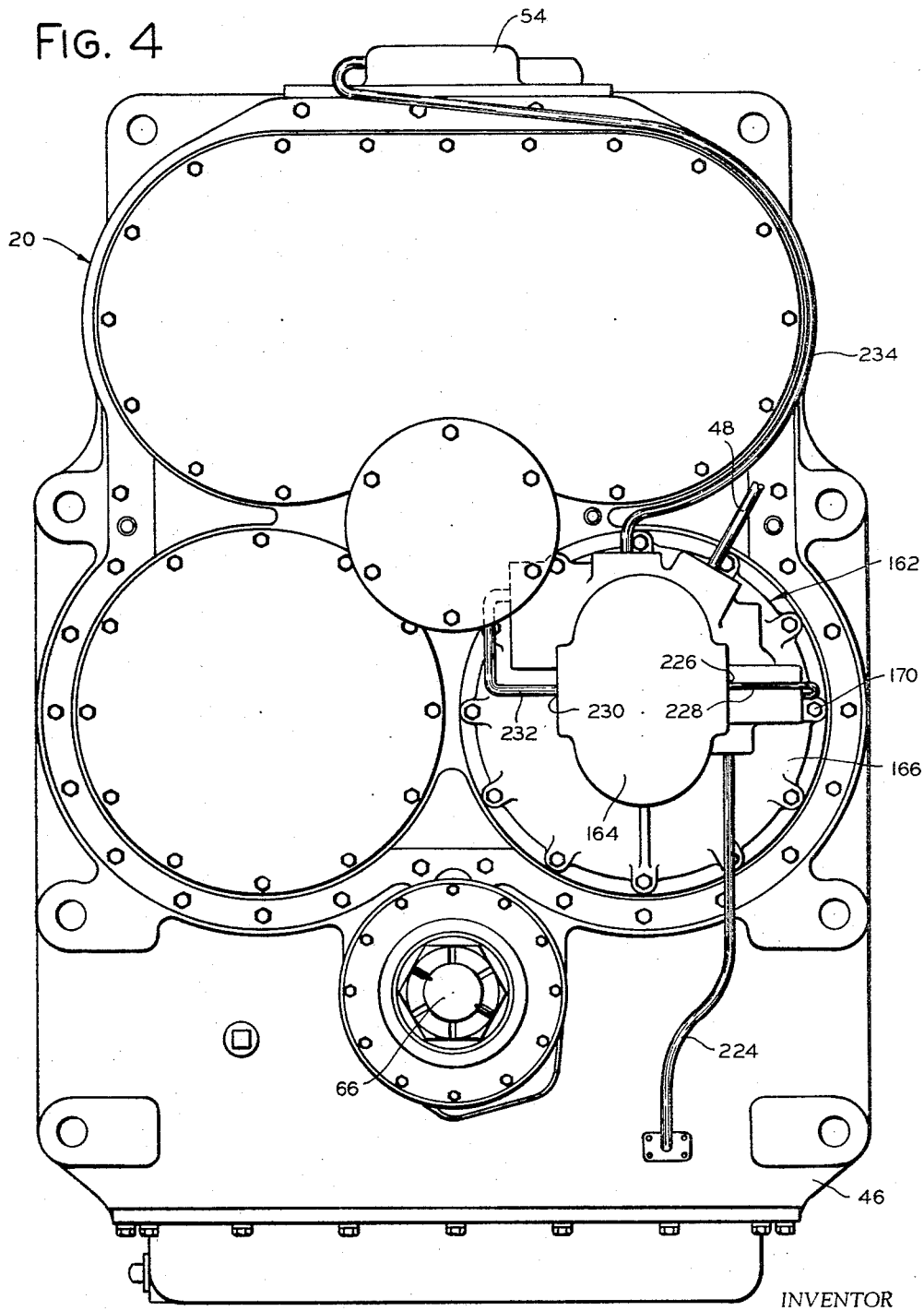

Aug. 8, 1967     B. S. ZELLER     3,334,703
PUSH-START CIRCUIT

Filed June 7, 1965     6 Sheets-Sheet 5

INVENTOR
BURTON S. ZELLER
BY *Robert H Johnson*
ATTORNEY

Aug. 8, 1967

B. S. ZELLER 3,334,703

PUSH-START CIRCUIT

Filed June 7, 1965

INVENTOR
BURTON S. ZELLER

BY Robert H Johnson

ATTORNEY

United States Patent Office 3,334,703
Patented Aug. 8, 1967

3,334,703
PUSH-START CIRCUIT
Burton S. Zeller, Parma, Mich., assignor to Clark
Equipment Company, a corporation of Michigan
Filed June 7, 1965, Ser. No. 461,776
4 Claims. (Cl. 180—53)

ABSTRACT OF THE DISCLOSURE

A push-start circuit having a wheel driven auxiliary pump with inlet and outlet ports anad a control valve operative in response to the fluid pressure generated by the main vehicle pump to connect the auxiliary pump outlet port to the vehicle transmission control circuit and connect the main pump to the auxiliary pump inlet port or connect the auxiliary pump outlet port to the auxiliary pump inlet port and connect the main pump to the vehicle transmission control circuit.

Vehicles that are equipped with power-shifted transmissions and/or hydrodynamic torque converters normally have a so-called charging or main pump which is driven by the vehicle engine and which provides pressurized fluid for actuating the transmission clutches and filling the converter with fluid. In the event that it is not possible to start the vehicle engine by the normal means, i.e. a starter motor which is battery operated, it is desirable to have some alternative means of starting the vehicle engine. Usually a vehicle engine can be started by simply engaging the transmission, and then pushing or pulling the vehicle with another vehicle. In order to be able to start the engine of a vehicle equipped with a fluid pressure actuated transmission and a hydrodynamic torque converter it is necessary to have a pump which is driven by the vehicle drive wheels so that fluid pressure can be generated to actuate the transmission clutches to engage them and fluid can be pumped into the converter to fill it, whereby the vehicle engine can be cranked by pushing the vehicle with another vehicle. Such push-start circuits for vehicles having fluid pressure actuated transmissions and torque converters are already known. The object of the present invention is to provide a simplified push-start circuit which is operative only when required.

Another object of my invention is to provide a push-start circuit having a pump which is by-passed when the vehicle engine is operating.

In carrying out my invention in a preferred embodiment I provide an auxiliary pump drivingly connected to the vehicle drive wheels and a spool valve connected to the auxiliary pump, the vehicle charging pump and the fluid supply port of the pressure fluid actuated transmission. The valve is normally biased to a position in which the auxiliary pump is connected to the fluid reservoir and directs pressurized fluid to the supply port of the transmission, the inlet of the auxiliary pump also being connected to the outlet of the charging pump. The valve is shiftable to a second position in response to a predetermined fluid pressure from the charging pump, in which position the outlet of the auxiliary pump is connected with the inlet of the auxiliary pump and the charging pump is connected with the supply port of the transmission which also supplies fluid to a hydrodynamic torque converter.

Figure 1:
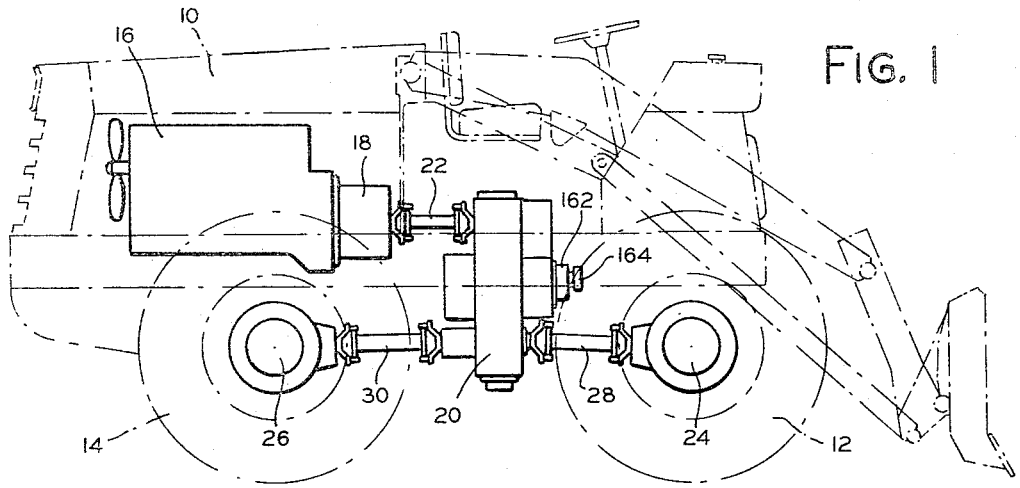
Figure 5:
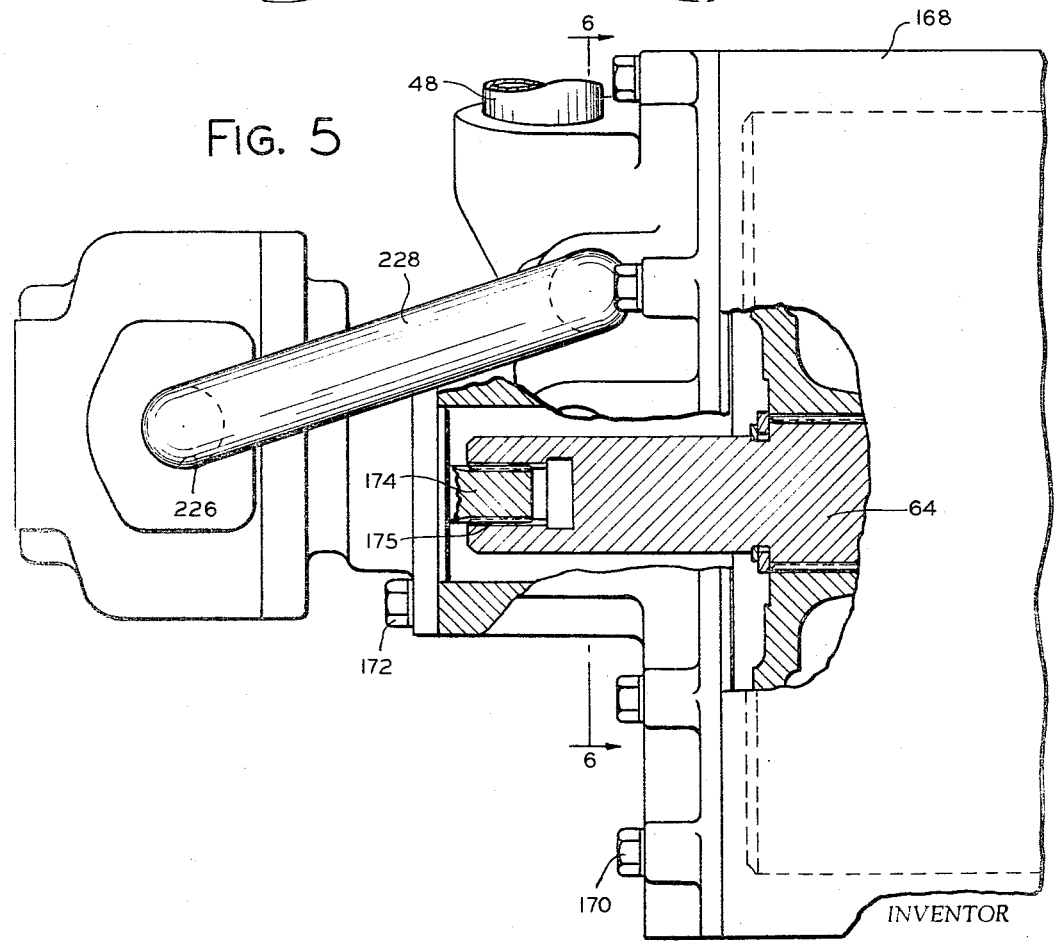
Figure 2:
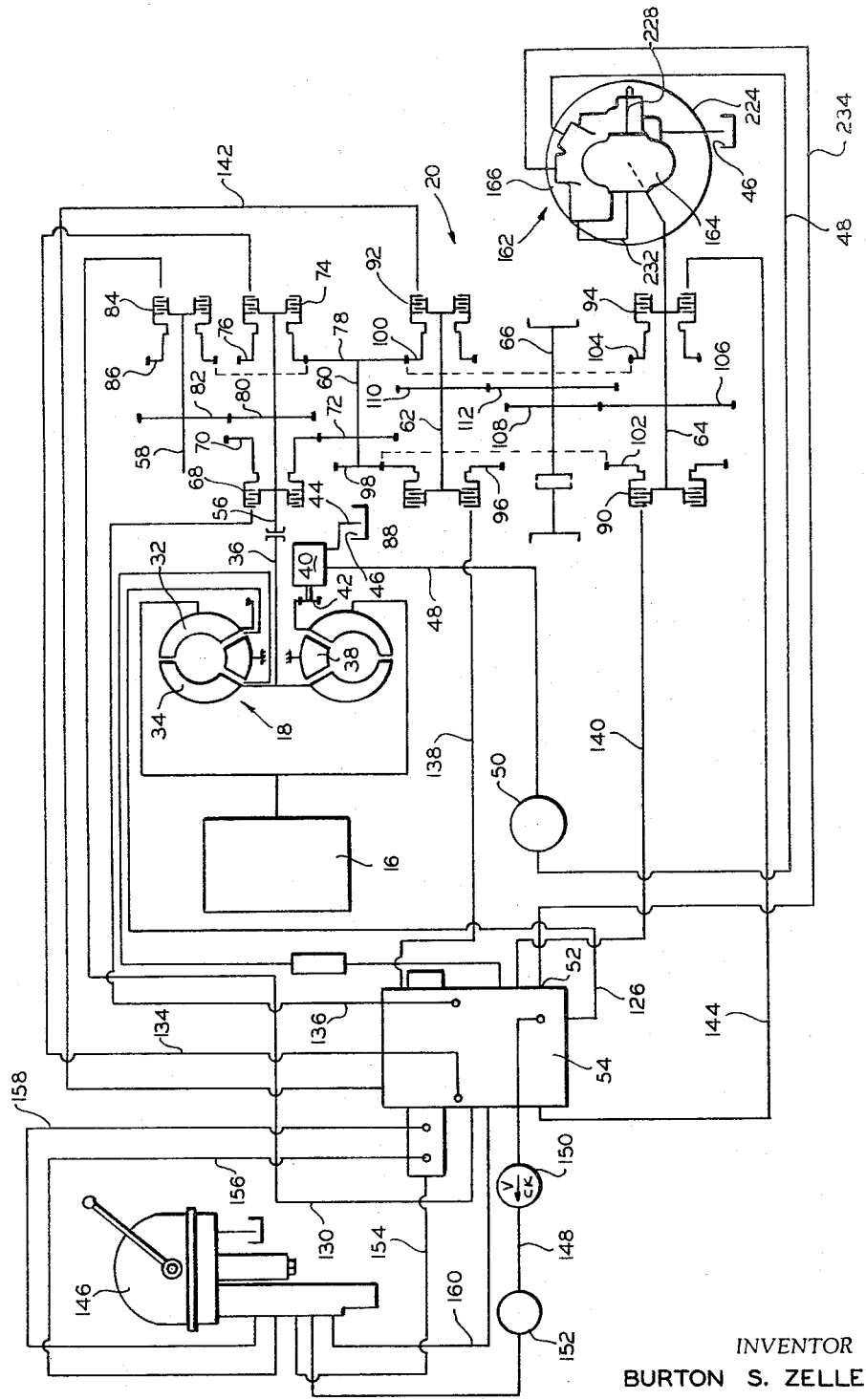
Figure 3:
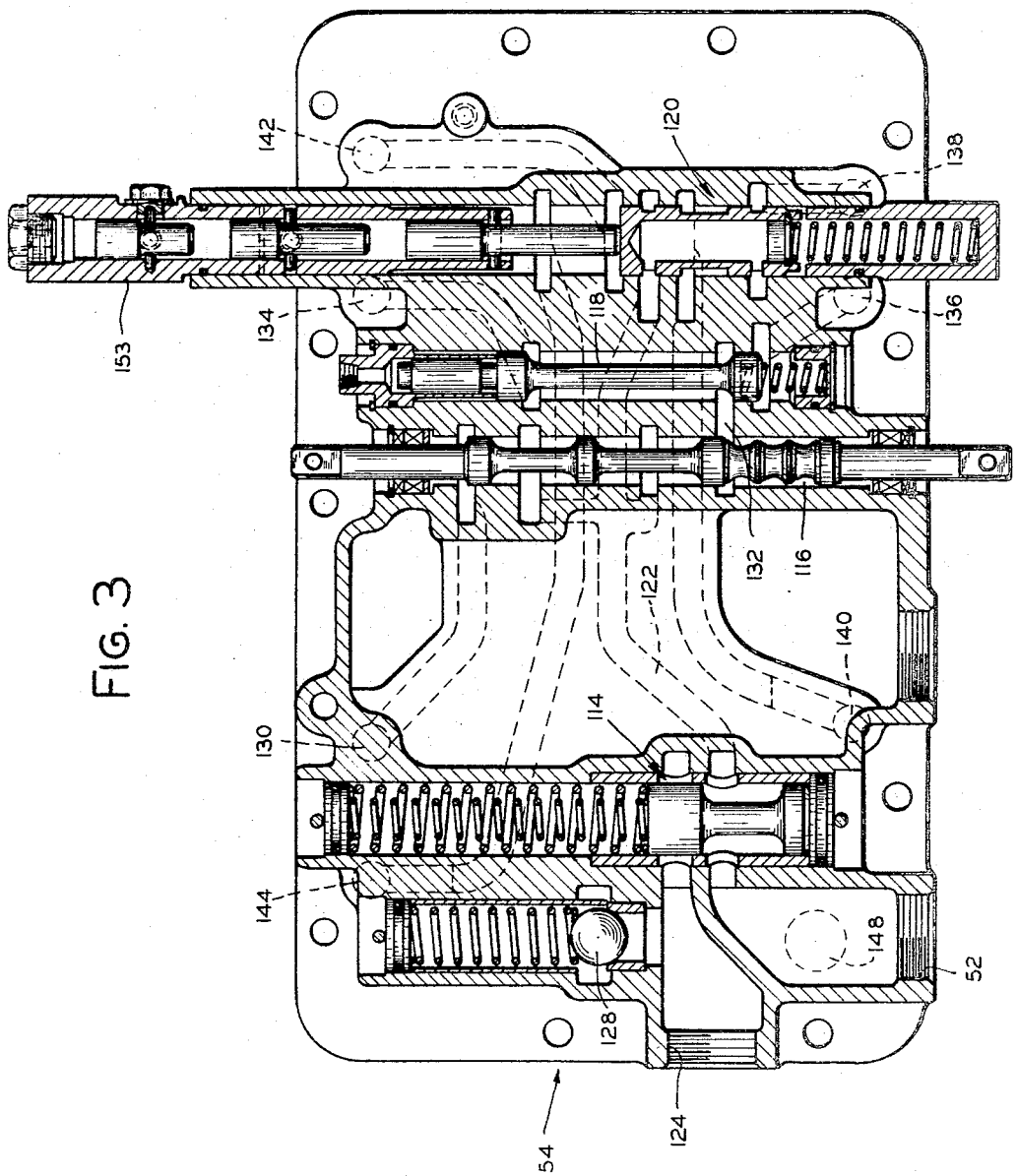
Figure 6:
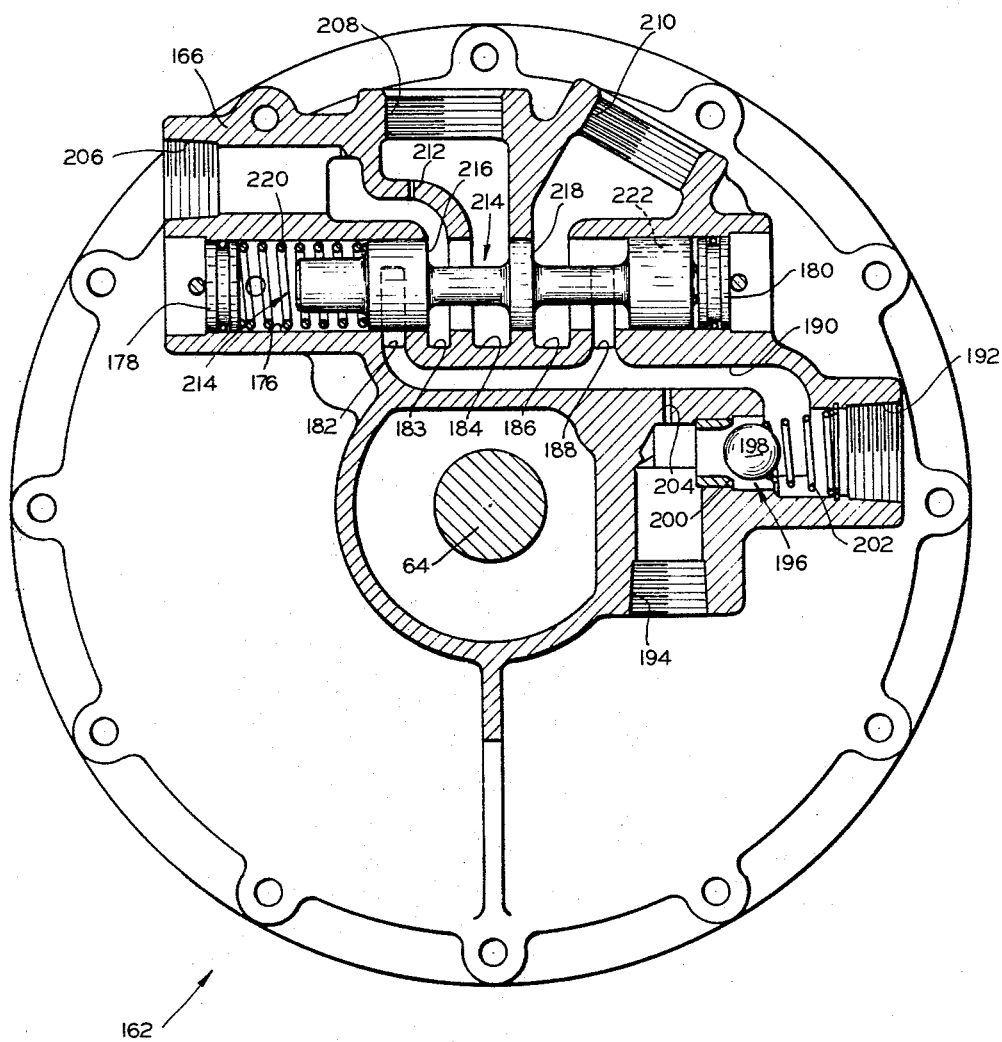
Figure 7:
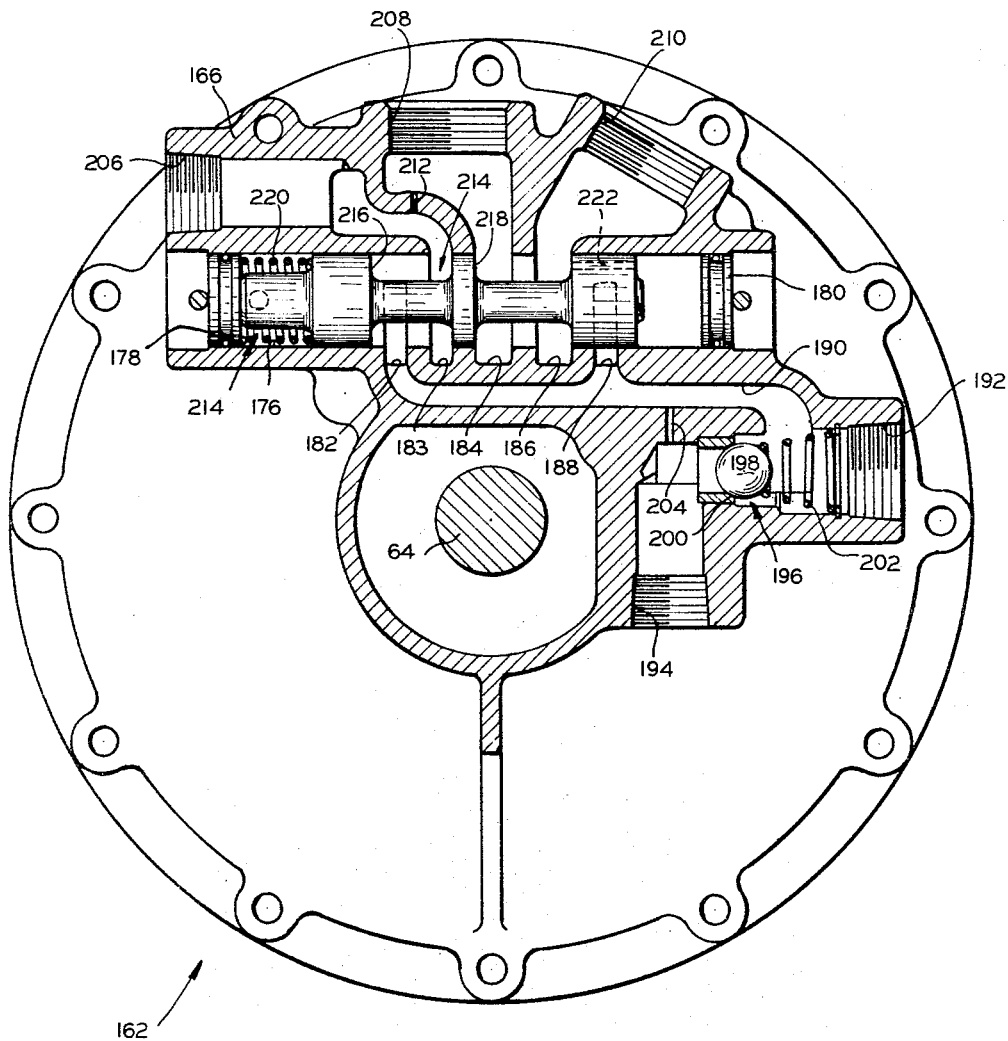

The above and other objects, features and advantages of my invention will be more clearly understood when the following description is taken in conjunction with the accompanying drawing in which:

FIGURE 1 shows in phantom outline a vehicle embodying a drive train which incorporates my invention, FIGURE 2 shows schematically the fluid pressure actuated transmission of FIG. 1, including the hydraulic circuitry associated therewith, FIGURE 3 is a cross-section of the bank of control valves for the fluid pressure actuated transmission, FIGURE 4 is an end elevation of the fluid pressure actuated transmission shown in FIGS. 1 and 2, FIGURE 5 is a fragmentary view showing the driving connection of the auxiliary pump to one of the intermediate shafts of the transmission, FIGURE 6 is a view taken along line 6—6 of FIG. 5 and shows the position of the push-start valve control when the vehicle engine is not operating, and FIGURE 7 is similar to FIG. 6, except that the push-start control valve is shown in the position in which it is maintained when the vehicle engine is operating.

Referring to FIG. 1, the reference numeral 10 denotes generally a vehicle shown in phantom outline having a pair of front drive wheels 12 and a pair of rear drive-steer wheels 14. Vehicle 10 includes a prime mover 16 which may be a diesel or internal combustion engine, for example. Driven by engine 16 is a hydrodynamic torque converter 18 which is connected to the input of a fluid pressure actuated change speed transmission 20 by a drive shaft 22. The output shaft of transmission 20 is connected to front and rear drive axles 24 and 26 by means of propeller shafts 28 and 30, respectively. From the foregoing description of the drive train it will be appreciated that engine 16 can be cranked by pushing vehicle 10 if transmission 20 is engaged.

Referring to FIGS. 2 and 3, the torque converter and change speed transmission will be briefly described. Torque converter 18 includes an impeller member 32 connected to prime mover 16, a turbine member 34 which is connected to an output shaft 36 and a stationary reaction member 38. The impeller, turbine and reaction members form a toroidal chamber which is filled with fluid, the fluid reacting with the three members to form a driving connection between the impeller and the turbine members as is well known to those skilled in the art. A charging or main pump 40 is mounted on torque converter 18 and is drivingly connected to engine 16 through impeller member 32 by means of a gear train 42. Pump 40 draws fluid through a conduit 44 from a fluid reservoir or sump 46 located in the bottom of the casing of transmission 20 and then directs pressurized fluid through a conduit 48 which contains a fluid filter assembly 50 to a port associated with a push-start control valve 162 which will be described in detail hereinafter.

Transmission 20 is a constant mesh gear transmission with fluid pressure actuated disc clutches for connecting certain of the gears to certain of the shafts to provide various transmission speeds. Transmission 20 is arranged to provide eight forward speeds and four reverse speeds. More specifically, transmission 20 includes an input shaft 56 which is connected to output shaft 36 or torque converter 18, a reverse shaft 58, an idler shaft 60, a pair of countershafts 62 and 64 and an output shaft 66. A high range clutch 68 is carried by input shaft 56 adjacent one end thereof and has a gear 70 connected thereto. Gear 70 meshes with another gear 72 which is fixed to idler shaft 60. Also carried by input shaft 56 is a low range clutch 74 to which a gear 76 is connected. Gear 76 meshes with another gear 78 fixed to idler shaft 60. A gear 80 is fixed to input shaft 56 and meshes with another gear 82 which is fixed to reverse shaft 58. Reverse shaft 58 carries a reverse clutch 84 to which a gear 86 is connected. Gear 86 meshes with gear 78.

Also included in transmission 20 is a first speed ratio clutch 88, a second speed ratio clutch 90, a third speed ratio clutch 92 and a fourth speed ratio clutch 94. First and third speed ratio clutches are carried by countershaft 62. First speed ratio clutch 88 has a gear 96 connected to it which meshes with another gear 98 fixed to idler shaft 60. Similarly, third speed ratio clutch 92 has a gear 100 connected to it which meshes with gear 78. Second speed ratio clutch 90 and fourth speed ratio clutch 94 are carried by countershaft 64. Second speed ratio clutch 90 has a gear 102 connected to it which meshes with another gear 98. Similarly, fourth speed ratio clutch 94 has a gear 104 connected to it which meshes with gear 78. Fixed to countershaft 64 is a gear 106 which meshes with another gear 108 that is fixed to output shaft 66. Similarly, a gear 110 is fixed to countershaft 62 and meshes with another gear 112 which is fixed to output shaft 66.

At this point it will be understood that the various clutches may be engaged by supplying them with pressurized fluid. Engagement of the various clutches causes the gear which is connected to the respective clutch to be fixed to the shaft which carries the clutch for conjoint rotation therewith. Further, power is transmitted through transmission 20 by engaging either the low range clutch 74, the high range clutch 68 or the reverse clutch 84 and one of the four speed ratio clutches 88, 90, 92 and 94. For a more detailed explanation of a transmission which is similar to the present transmission, except for the addition of the high range clutch 68, see U.S. Patent No. 3,126,752 issued Mar. 31, 1964, in the name of R. H. Bolster.

Referring now also to FIG. 3, the transmission control system will be briefly described. It will be seen that disposed in cover plate 54 is a bank of valves including a regulating valve 114, a direction control valve 116, range control valve 118 and a speed ratio control valve 120. Regulating valve 114 is supplied normally with pressurized fluid from charging pump 40 via supply port 52 and serves to direct pressurized fluid under regulated pressure to direction control valve 116 via a fluid passage 122 and to the toroidal chamber of torque converter 18 via port 124 and fluid conduit 126. Communicating with port 124 is a spring biased relief valve 128 which serves to limit the fluid pressure in torque converter 18. Normally, regulating valve 114 provides fluid passages 122 with pressurized fluid, the maximum pressure of which is regulated preferably at 180–220 p.s.i. Further, regulating valve 114 insures that pressurized fluid under proper pressure is first directed to fluid passage 122 before fluid at a lower pressure is directed to torque converter 18.

Direction control valve 116 receives pressurized fluid from conduit 122 and is operable to direct the pressurized fluid to reverse clutch 84 via a fluid passage 130 in one poistion thereof and operable to direct pressurized fluid to range control valve 118 via a fluid passage 132 in another position thereof.

Range control valve 118 is operable to direct pressurized fluid either to low range clutch 74 via a fluid passage 134 or to high range clutch 68 via a fluid passage 136.

Fluid conduit 122 also communicates with speed ratio control valve 120 which is actuatable to four positions to alternately direct pressurized fluid to first speed ratio clutch 88, second speed ratio clutch 90, third speed ratio clutch 92 or fourth speed ratio clutch 94 via fluid passages 138, 140, 142 and 144, respectively.

Range control valve 118 and speed ratio clutch control valve 120 are controlled by means of a master controller 146 which is supplied with pressurized fluid via a conduit 148 which communicates with port 52 and includes a one-way check valve 150 and an accumulator 152. Further, controller 146 is connected to a multi-position actuator 153 for positioning speed ratio control valve 120 in the desired position by means of conduits 154, 156 and 158. Also, range control valve 118 is connected to master controller 146 via a conduit 160.

For a more detailed explanation and description of the transmission control system reference may be had to my co-pending U.S. patent application, Ser. No. 446,932, which was filed on Apr. 9, 1965, and is assigned to the same assignee as the present application.

From the foregoing it will be apparent that transmission 20 will be engaged to transmit power, provided that pressurized fluid is supplied to supply port 52, if direction control valve 116 is positioned to direct pressurized fluid either to reverse clutch conduit 130 or to range control valve 118. The master controller 146 is arranged so that one of the speed ratio clutches always will be engaged whenever pressurized fluid is supplied to supply port 52 regardless of the position of master controller 146.

Referring now also to FIGS. 4, 5, 6 and 7, my push-start circuit will be described in detail in conjunction with the previously described transmission controls. The push-start circuit includes push-start control valve 162 and an auxiliary pump 164.

Control valve 162 includes a valve body 166 which is connected to the end of the fourth speed ratio clutch cover 168 by means of a plurality of machine screws 170 (FIG. 5). Also, auxiliary pump 164 is connected to valve body 166 by means of a plurality of machine screws 172. At this point it will be noted that valve body 166 and auxiliary pump 164 are shown rotated 90° away from their normal position in FIG. 2 for the sake of clarity, although actually they are disposed so that the shaft 174 of auxiliary pump 164 is coaxial with countershaft 64 of transmission 20 and connected thereto by a splined connection 175. Located in valve body 166 is an elongated bore 176 which has the ends thereof closed by means of caps 178 and 180. Cut in the wall of bore 176 are five longitudinally spaced apart grooves 182, 183, 184, 186 and 188. Grooves 182 and 188 are connected together by a fluid passage 190 which communicates with a port 192 disposed in valve body 166. Adjacent port 192 is another port 194 which is connected to port 192 by means of a one-way ball check valve 196. Valve 196 includes a ball 198 biased to seal against a valve seat 200 by a spring 202 so that fluid can flow only from port 194 toward port 192. A restricted passage or orifice 204 connects fluid passage 190 directly with port 194. Also disposed in valve body 166 is a port 206 which communicates with groove 183, a port 208 which communicates with groove 184, a port 210 which communicates with groove 186. A restricted fluid passage or orifice 212 connects directly between ports 206 and 208.

Disposed in bore 176 for reciprocal longitudinal movement therein is a valve spool 214 having a pair of longitudinally spaced apart annular grooves 216 and 218 cut in the outer periphery thereof. Spool 214 normally is biased toward the extreme rightward position shown in FIG. 6 by means of a helical compression spring 220 disposed in bore 176 between cap 178 and the adjacent end of spool 214. Spool 214 has a fluid passage 222 drilled therein which connects groove 218 with the adjacent end of spool 214. Thus, when pressurized fluid is supplied to port 210 pressurized fluid also will be supplied, via fluid passage 222, to the chamber defined by bore 176, cap 180 and the adjacent end of spool 214. When the force exerted by the pressurized fluid against the end of spool 214 adjacent cap 180 is great enough the bias of spring 220 will be overcome, whereby spool 214 will shift to the extreme leftward position as shown in FIG. 7. At this point it will be clear that grooves 216 and 218 cooperate with grooves 182, 183, 184, 186 and 188 so that when spool 214 is in the extreme rightward position (FIG. 6) port 192 is in fluid communication with port 210 and port 206 is in fluid comunication with port 208. When spool 214 is in the extreme leftward position (FIG. 7), then the grooves cooperate so that port 192 is in fluid communication with port 206 and port 208 is in fluid communication with port 210.

Port 194 is connected with sump 46 by means of a fluid conduit 224 (FIGS. 2 and 4). Port 192 is connected with the inlet port 226 (FIGS. 4 and 5) of the auxiliary pump 164 by a fluid conduit 228. Port 206 is connected with the outlet port 230 (FIG. 4) of auxiliary pump 164 by a fluid conduit 232. Also, port 208 is connected with supply port 52 in cover plate 54 by a fluid conduit 234 and port 210 is connected with charging pump 40 by means of conduit 48.

In order to enable persons skilled in the art to better understand my invention I will now describe the operation of it. It will be assumed that the engine 16 of vehicle 10 cannot be started by the starter motor and that it is desired to start the engine by pushing vehicle 10. The vehicle operator manipulates direction control valve 116 so that pressurized fluid will be directed to range control valve 118, assuming that the vehicle 10 will be pushed forwardly, and manipulates master controller 146 so that the desired speed ratio clutch will be engaged, preferably a low speed ratio clutch such as clutch 88. With the transmission thus conditioned vehicle 10 is then pushed forwardly so that the rotation of drive wheels 12 and 14 will cause transmission output shaft 66 to rotate. Because countershaft 64 is connected to shaft 66 by means of constantly meshing gears 106 and 108 which are fixed to their respective shafts, shaft 64 also will rotate with the result that auxiliary pump 164 will be driven, causing it to draw fluid from sump 46 through port 194 and past check valve 196. The pressurized fluid generated by auxiliary pump 164 then is directed to port 206 which is in fluid communication with port 208 since spool 214 will be in its extreme right position as shown in FIG. 6, there not yet being sufficient force exerted on the end of spool 214 to overcome the bias of spring 220. The pressurized fluid supplied by auxiliary pump 164 then is directed to supply port 52 and from there is directed to the appropriate clutches to engage transmission 20 to transmit power between the drive wheels and the dead engine. A portion of this fluid also is supplied to converter 18 so that it is maintained full of fluid. Also, it will be noted at this point that port 210 is in fluid communication with port 192. Thus, when the vehicle is being pushed and the engine 16 is being cranked, but has not yet started to run, the small amount of fluid being pumped by charging pump 40 is being directed to the inlet port of auxiliary pump 164. This arrangement prevents premature shifting of valve spool 214. As soon as engine 16 starts to run, charging pump 40 generates a fluid pressure which is sufficient to cause spool 214 to shift to the extreme left position shown in FIG. 7. When this occurs ports 192 and 206 are placed in direct communication which has the effect of connecting the inlet and outlet ports of auxiliary pump 164 so that the auxiliary pump no longer generates pressurized fluid, but simply circulates fluid in a closed circuit. At the same time the pressurized fluid generated by charging pump 40 is directed to supply port 52 so that the pressurized fluid generated thereby is available for operating the transmission control and torque converter. At this point it will be seen that the fluid pressure in port 208 is higher than the fluid pressure in port 206, and so there will be a restricted fluid flow through passage 212 from port 208 to port 206. Also, the fluid pressure in passage 190 will be higher than the fluid pressure in port 194 so that there will be a restricted fluid flow from passage 192 to port 194. The result of this is that the fluid which is being circulated by the auxiliary pump 164 will be continuously changed at a slow rate so that the circuit associated with the auxiliary pump will be maintained full and supplied with cooler fluid in order to prevent overheating of the fluid that is merely being circulated by auxiliary pump 164.

An advantage of the above-described push-start circuit is that the output of the auxiliary pump is removed from the transmission control circuitry when it is no longer needed. This is advantageous because otherwise the transmission control circuitry will have to be designed so as to allow for a variable fluid flow input since the output of auxiliary pump 164 will vary as the speed of the drive wheels varies, whereas the charging pump is maintained at a substantially constant output because the engine 16 normally will be operated at a substantially constant governed speed.

The above-detailed description of my push-start circuit and the components thereof is intended to be illustrative only, and should not be considered as limiting my invention to any particular embodiment, since it is possible to make numerous modifications and changes without departing from the spirit and scope of my invention.

I claim:

1. For use with a vehicle having an engine, ground engaging drive wheels, drive train means for transmitting power from the engine to the wheel means including a fluid pressure actuated change speed transmission, a main pump driven by the engine and a fluid sump, a push-start circuit comprising an auxiliary pump drivingly connected to the wheels and having inlet and outlet ports, a valve for isolating said main and auxiliary pumps when the vehicle is under normal operation and including a body, a bore in said body, first, second, third, fourth and fifth ports in said body in communication with said bore, a spool disposed in said bore and actuatable between first and second positions, said spool including a pair of grooves which cooperate with said first, second, third, fourth and fifth ports so that when said spool is in said first position said second and third ports are in fluid communication and said fourth and fifth ports are in fluid communication and when said spool is in said second position said first and second ports are in fluid communication and said third and fourth ports are in fluid communication, means biasing said spool to said first position, and said spool being actuated to said second position when a predetermined fluid pressure is generated by the main pump, first fluid passage means connecting the sump and said auxiliary pump inlet port, a check valve disposed in said first fluid passage means for permitting fluid flow only from the sump towards said auxiliary pump inlet port, second fluid passage means connecting said first and fifth ports with said first fluid passage means intermediate said check valve and said auxiliary pump inlet port, third fluid passage means connecting said auxiliary pump outlet port and said second port, fourth fluid passage means connecting said third port and the transmission, and fifth fluid passage means connecting said fourth port and the main pump.

2. A push-start circuit as set forth in claim 1 and including a first orifice connecting said second fluid passage means and said first fluid passage means intermediate the sump and said check valve and a second orifice connecting said third and fourth fluid passage means.

3. For use with a vehicle having a fluid pressure actuated transmission with a fluid supply port, ground engaging drive means drivingly connected to the transmission, a main pump with an outlet port, and a fluid reservoir, a push-start circuit comprising an auxiliary pump drivingly connected to the drive means and including inlet and outlet ports, a control valve including a valve body, a bore in said body, said bore having a closed end, first, second, third, fourth and fifth ports in said body which communicate with said bore, a spool disposed in said bore and slidable between first and second positions therein and resilient means engaging one end of said spool and biasing said spool to said first position, the other end of said spool forming with said closed end of said bore a fluid chamber, means connecting said chamber with the main pump outlet port so that said spool is actuated to said second position against the bias of said resilient means when the main pump generates a predetermined fluid pressure, said spool including a plurality of grooves which cooperate with said first, second, third, fourth and fifth ports so that said second and third ports are in fluid communication with each other and said fourth and fifth ports are in fluid communication with each other when said spool is in said first position and said first and second ports are in fluid communication with each other and said third and fourth ports are in fluid communication with each other when said spool is in said second position, first fluid passage means connecting the reservoir and said auxiliary pump inlet port, a one-way valve disposed in said first fluid passage means so that fluid can flow only from said reservoir towards said auxiliary pump inlet port, second fluid passage means connecting said first and fifth ports with said first fluid passage means, third fluid passage means connecting said auxiliary pump outlet port with said second port, fourth fluid passage means connecting said third port with the supply port and fifth fluid passage means connecting said fourth port with the main pump outlet port.

4. A push-start circuit as set forth in claim 3 and including a first orifice connecting said second fluid passage means with said first fluid passage means intermediate the reservoir and said check valve and a second orifice connecting said third and fourth fluid passage means.

References Cited
UNITED STATES PATENTS 3,065,810   11/1962   Chambers et al. _____ 180—53
3,164,959   1/1965   Condek _____ 60—52

A. HARRY LEVY, *Primary Examiner.*